United States Patent [19]

Schwemmer

[11] Patent Number: 5,184,241
[45] Date of Patent: Feb. 2, 1993

[54] DOPPLER SHIFT COMPENSATION SYSTEM FOR LASER TRANSMITTERS AND RECEIVERS

[75] Inventor: Geary K. Schwemmer, Hampstead, Md.

[73] Assignee: The United States of America as represented by the Administrator of the National Aeronautics & Space Admininstration, Washington, D.C.

[21] Appl. No.: 369,171

[22] Filed: Jun. 21, 1989

[51] Int. Cl.$^5$ .............................................. H04B 10/00
[52] U.S. Cl. .................................... 359/161; 367/904
[58] Field of Search ............... 455/606, 607, 609, 610, 455/611, 612, 613, 604, 617, 618, 619; 370/1, 3; 367/904; 359/161, 153, 180, 189, 190; 250/201–209

[56] References Cited

U.S. PATENT DOCUMENTS

| | | | |
|---|---|---|---|
| 3,939,341 | 2/1976 | Graves | 455/619 |
| 3,970,838 | 7/1976 | Goodwin | 455/619 |
| 3,975,628 | 8/1976 | Graves | 455/619 |
| 4,033,882 | 7/1977 | Fletcher | 455/619 |
| 4,515,472 | 5/1985 | Welch | 455/609 |
| 4,723,310 | 2/1988 | DeCorlieu | 455/617 |

Primary Examiner—Edward L. Coles, Sr.
Assistant Examiner—Kinfe-Michael Negash
Attorney, Agent, or Firm—Ronald F. Sandler; R. Dennis Marchant; Guy M. Miller

[57] ABSTRACT

A laser transmitting and receiving system includes doppler compensation for large doppler shifts in frequency caused by relative motion between a collocated transceiver and a target or relative motion between separated transmitters and receivers. The system includes a tunable laser, a dithered laser optical frequency standard, and a computer for calculating the estimated doppler shift at a given time using platform navigation and attitude control inputs as well as inputs relating to pointing data controlling the direction of transmission. The frequency standard and the computer output are employed to develop a doppler compensation signal which may be used to shift the frequency of the laser transmitter or shift the bandpass of a laser receiver filter. The doppler compensation is provided by a feedback loop which may include r.f. components, a timing trigger from the computer, or wavemeters.

12 Claims, 5 Drawing Sheets

DOPPLER SHIFT COMPENSATION SYSTEM FOR LASER TRANSMITTERS AND RECEIVERS

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to laser beam applications and lightwave communications, and more particularly to satellite to ground, ground to satellite, and satellite to satellite laser communications and laser remote sensing systems on satellite platforms.

BACKGROUND OF THE INVENTION

Laser systems that use satellite platforms for earth remote sensing or communications will have doppler frequency shifts associated with the platform motion relative to the ground and the earth's rotational velocity, particularly with low earth orbiting (LEO) platforms, such as the space shuttle, space station, and polar orbiting platforms, that have a relative ground track speed of about 7 km/sec. The instant invention was developed specifically for a satellite-borne, atmospheric remote sensing instrument having a pulsed laser transmitter and optical receiver both located on a low orbit satellite, having a conical scan pattern centered about nadir and probing spectrally narrow atmospheric absorption lines. The scan period is ten seconds, and the pointing angle is 45 degrees off nadir, giving rise to doppler shifts of + and −7.3 GHz at near infrared wavelengths of 770 nm. The magnitude and direction of the doppler shift varies with the scanner azimuth angle and the satellite latitude. Although the instrument has a direct detection receiver, the optical filter bandpass is made very narrow in order to reject scattered solar background radiation; hence, the inherent doppler shifts would ordinarily be sufficient to move the laser frequency out of the filter bandpass. This invention provides for a means to simultaneously frequency tune both the laser transmitter and the optical receiver filter to compensate for the doppler shifts imposed by the relative motion between the satellite and the atmosphere, thereby allowing for the use of a narrow bandpass optical filter. This invention can also be applied to other satellite laser systems such as ground to low earth orbiting satellite systems and satellite to satellite optical communication links where there are large relative velocities which, in turn, induce doppler shifts that may be significant to the operation of the instrument.

The prior art for dealing with the doppler effect in laser satellite communication systems or laser satellite ranging systems has been to make the optical bandwidth of the receiver wide enough to encompass the frequency shifts and to increase the laser transmitter energy to overcome the higher solar background encountered with the wider filter. These techniques result in undesirable signal to noise characteristics and power requirements.

SUMMARY OF THE INVENTION

Accordingly, it is an object of this invention to provide frequency turning of collocated laser transmitters and optical receivers to compensate for doppler shifts caused by the relative motion between the system and a scattering object or objects such as in a laser remote sensing system, or, alternatively, to compensate for doppler shifts imposed by the relative motion between a laser transmitter and optical receiver when they are located on different platforms.

Another object of this invention is to provide a laser system subject to doppler shifts which may employ narrow band optical receiver filters for improved signal to noise ratios.

According to the invention, these and other objects are attained by providing a doppler compensation system which includes an absolute frequency standard stabilized laser source, a computer with which to calculate expected doppler shifts based on satellite navigation and laser system pointing data, and a means to apply compensating frequency shifts to the stabilized laser source or to a second, tunable laser. The tunable laser can then be used as a laser transmitter or to control a laser transmitter by injection seeding. Alternatively, the tunable laser source may be used to control the bandpass frequency of an optical receiver filter.

DETAILED DESCRIPTION

Figure 1:
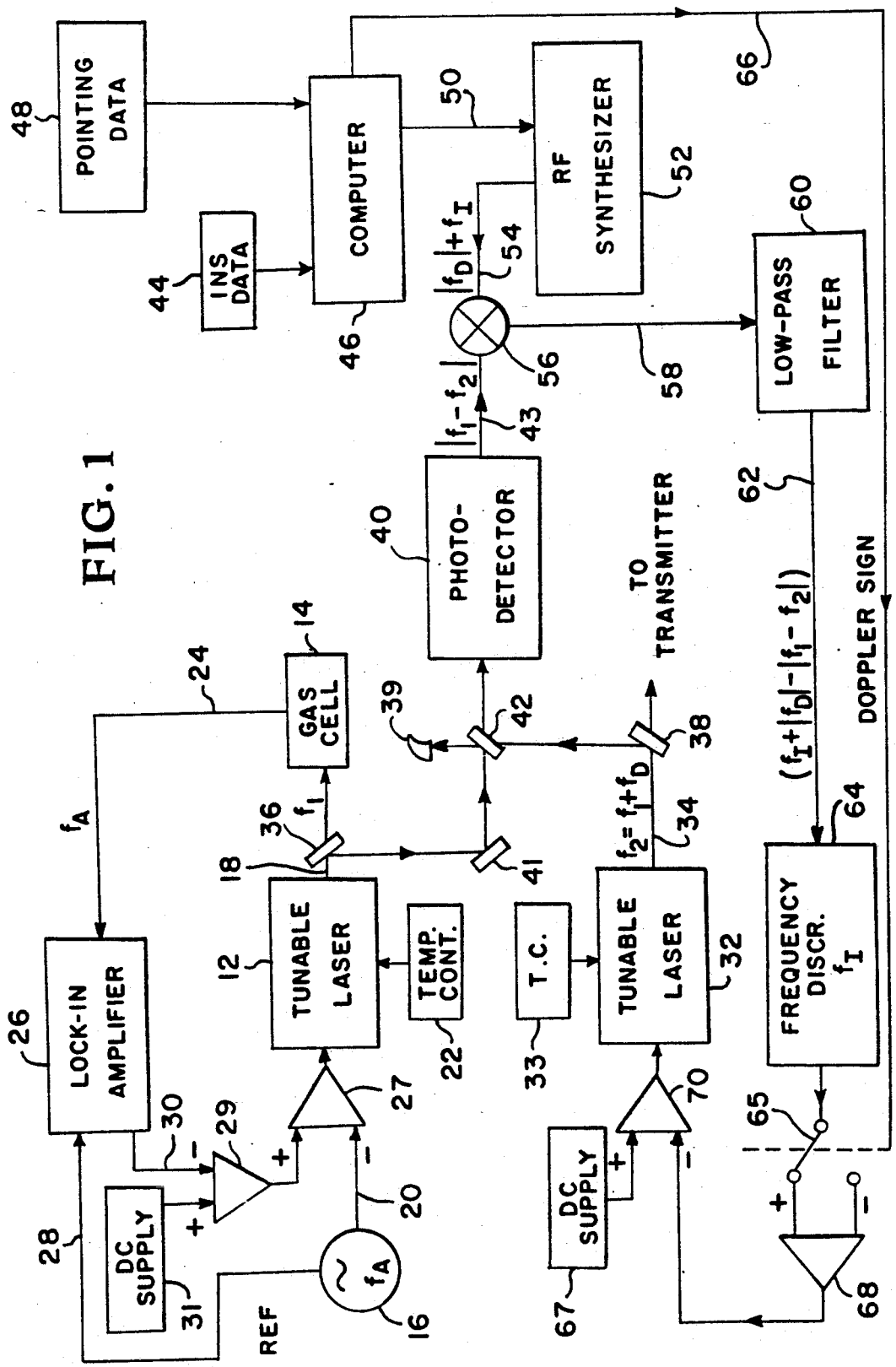
FIG. 1 is a block diagram illustrating an embodiment of the invention.

Reference is now made to the drawings wherein like references designate identical or corresponding parts throughout the several views, and in particular to FIG. 1, where a laser doppler compensation system is represented in block format. This system includes a tunable single mode (single frequency) laser 12 that is frequency locked to a molecular or atomic gas transition using a photo-acoustic or absorption gas cell, or a hollow-cathode discharge lamp. In this example we use a low power AlGaAs diode laser locked to an absorption transition of molecular oxygen using a photo-acoustic cell 14. The cell 14 is filled with oxygen and has transparent windows through which the laser beam 18 is directed. The diode laser 12 is current modulated with a small oscillator 16 at some acoustic frequency $f_A$. This causes the diode output 18 to dither about some center frequency $f_1$, with a frequency excursion determined by the amplitude of the modulation current 20. The diode center frequency is determined by the bias current through the diode and the temperature of the diode. These are set using a variable d.c. power supply 31 and a conventional temperature controller 22, so that the diode laser output frequency is centered over the absorption frequency of the gas in the cell to which the laser is to be stabilized. In the photo-acoustic cell 14, a microphone is used to pick up the audio signal 24 caused by gas pressure fluctuations set up as the dithering laser frequency tunes across the gas absorption line. The microphone output signal is input to a lock-in amplifier 26, along with a reference signal 28 from the diode current modulator 16. The lock-in amplifier will produce a d.c. output signal proportional to the amplitude of the microphone signal at frequency $f_A$ which is phase coherent with the oscillator reference signal. The output 30 of the lock-in amplifier is summed with the diode laser bias supply 31 in a differential amplifier 29, then summed with the oscillator signal 20 in a differential amplifier 27 and fed to the tunable laser 12 in a standard negative feedback arrangement to keep the diode output center frequency locked to the molecular absorption line. When a gas absorption cell is used in place of the photo-acoustic cell a photodiode or other optical or infrared detector is placed at the output window of the gas cell 14 and used to detect the gas absorption signal by measuring the laser light that gets transmitted through the gas cell. The part of the system consisting of the laser 12 and its current supply 31, the oscillator 16, the gas cell 14, and the lock-in amplifier 26, provides a stable absolute frequency reference to use with a second single mode tunable laser 32 nominally tuned to reference frequency f, using current supply 67 and temperature controller 33. This laser output 34 is frequency shifted to $f_2$ to provide the doppler compensated signal. Ideally, $f_2$ is at the center of the passband of the narrow band filter or, in the case of an atmospheric lidar, $f_2$ is centered on the doppler shifted absorption line. The output beam 34 may be used to apply doppler compensation frequency control to either a laser transmitter or an optical receiver, or both. When used to control the transmitter, the output 34 is either used directly as the transmitter beam or is injected into a laser amplifier or modulated, e.d., amplitude modulated, before transmitting. When used to control the receiver optical filter, the beam is directed through the filter, and the filter tuned to maintain maximum transmission of the beam as in a conventional actively (feedback) stablized optical filter. In a double ended system, e.g., a laser communication system, where the receiver and transmitter are in different platforms, only one end of the system needs to effect the doppler compensation. For example, if the transmitter has been doppler compensated, the receiver filter at the opposite end would remain locked to an essentially identical frequency standard to which the transmitter reference laser 12 is locked. A two-way communication system may be simplified it both the receiver and transmitter at one end of the system employ the same doppler compensation so it is not needed on the other end of the communication link. In the system of FIG. 1, the system may be either single or double ended.

A fraction of the output of each of the two tunable lasers 12 and 32 is split from each laser beam 18 and 34 using beamsplitters 36 and 38, and directed to a high bandwidth photo-detector 40 using a mirror 41 and a beamsplitter 42 to combine the two beams. The combined beam falling onto the photo-detector consists of that light from laser 12 that is transmitted through the beamsplitter 42 and that light from laser 32 that is reflected off of beamsplitter 42, and contains the two optical frequencies $f_1$ and $f_2$. The unused portion of each beam from beamsplitter 42 is directed to a beam dump 39. All optical mirrors and beamsplitters in this system must be of sufficient flatness and surface quality so as to preserve the optical phase front of the laser beams. The photo-detector 40 is used as an optical frequency mixer, and acts as a heterodyning element, the output 43 of which is an electrical signal containing the difference frequency of the two laser frequencies, $f_1$ and $f_2$, provided that this difference frequency falls within the bandwidth of the detector. At optical wavelengths, laser systems in low earth orbiting satellites can have doppler shifts that reach a magnitude of several gigahertz. If the bandwidth of the detector is insufficient to develope the difference frequency, then the heterodyning may be done in two or more steps, using another laser with an intermediate frequency in each stage. Alternatively, the laser output frequencies may be measured using an optical wavemeter as will be discussed later. It is the object of the remaining circuitry in FIG. 1 to maintain the output frequency, $f_2$, of laser 32, equal to the output frequency, $f_1$, of laser 12, plus the amount of doppler frequency shift, $f_D$, as computed by a general purpose computer 46. For example, to calculate the doppler shift for a remote sensing satellite probing the lower atmosphere, the spacecraft's effective ground speed is calculated using the satellite's altitude, which is then adjusted for the earth's rotational velocity using the orbital inclination and latitude. The velocity component along the laser beam is calculated from the adjusted ground speed based on the direction that the beam is pointing relative to the direction the satellite is moving and the pointing angle from nadir, taking into account the curvature of the earth. The doppler shift in the laser frequency will continually change for a conical scanning laser system from an increasing frequency as the laser is pointing forward in the direction of spacecraft motion, to a decreasing frequency as the laser scans around the side to the rear where it is pointing opposite the direction of travel, then increasing again as the system scans around the other side, and back to the front. The satellite's navigational computer provides the latitude and altitude or velocity data 44 as well as the satellite's attitude control data via digital communications lines such as a serial (e.g. RS-232) or parallel (e.g. 16-bit) I/O interface to the computer 46. The satellite's attitude control data and the laser system pointing data 48, which directs the transmitted laser beam, are also fed to the computer 46 by similar means, so that the doppler shift may be accurately calculated by the computer 46. The computer 46 sends an appropriate control signal 50 to a radio frequency synthesizer 52, which generates an output r.f. electrical signal current 54 with a frequency equal to the doppler shift plus an arbitrary intermediate radio frequency $f_1$. The input to the r.f. synthesizer may be either a serial or parallel digital interface or an analog electrical signal depending on how the synthesizer is constructed, however, at this time, this will typically be a digital (computer) interface. The output of the r.f. synthesizer 54 is beat with the output of the photo-detector 43 in an r.f. mixer 56. The output 58 of the r.f. mixer will contain sum, difference, fundamental and harmonic components of the two inputs 43 and 54. The output 58 is filtered with a low-pass electronic filter 60 to exclude all but the difference frequency signal 62, and will be at the intermediate frequency $f_1$ when the output frequency $f_2$ of laser 32 matches the output frequency $f_1$ of laser 12 plus the computed doppler frequency shift $f_D$. The filter output is applied to an r.f. frequency discriminator circuit 64 tuned to the intermediate frequency $f_1$. The output of the frequency discriminator 64 is a slowly varying, almost direct current, which is proportional to the frequency difference between $|f_D|$ and $|f_1-f_2|$. If this frequency difference is positive, then the output of the frequency discriminator 64 will be a positive voltage, and if the frequency difference is negative, the output will be negative. This current is used to tune the frequency of laser 32 in a negative feedback loop, maintaining the output 62 of the low pass filter at the frequency $f_I$, and hence the output 34 of the laser 32 at the frequency $f_1+f_D$. Because the coherence length of the lasers 12 and 32 may be short (<1 msec), the beat frequency, $f_1-f_2$, may have a varying random phase, so it is not known from the signal 62 whether $f_2$ is less than or greater than $f_1$, which is why absolute value symbols are used. Therefore, a logic signal 66, which may be a digital electronic or optical signal from the system computer 46, is used to assign the sign or polarity information to indicate the direction of the tuning correction to laser 32 by means of a switch 65 and a bipolar amplifier 68. For example, if the laser system is pointing opposite to the direction of motion, a negative doppler shift will occur, i.e., there will be a decrease in frequency. Compensation for this is made by shifting the laser transmitter frequency in the positive, or increasing frequency direction, by an amount $f_D$. If AlGaAs diode lasers are used for lasers 12 and 32, for which the frequency decreases as the current increases, then the computer 46 sets the doppler sign signal 66 to select the non-inverting input of differential amplifier 68, the output of which is applied to the inverting input of differential amplifier 70, causing any computed shifts to be applied so as to increase the laser frequency. If the laser output frequency $f_2$ is slightly greater than the value needed for a shift from $f_1$ to $f_1+f_D$, i.e., $|f_D|-|f_1-f_2|$ is a negative number, then the frequency of the signal 62 passed by the low pass filter 60 will be slightly lower than $f_I$, and the output of 64 will have a negative value. This causes the current to the diode 32 to increase, tuning the laser output 34 to a lower frequency, driving it to a value of $f_1+f_D$. If the frequency of laser output 34 goes below $f_1+f_D$, the output of the frequency discriminator 64 will be positive, driving the laser frequency back to $f_1+f_D$. If the system is pointing in the direction of spacecraft motion, the doppler compensation shift required is to a lower frequency, i.e., $f_D$ is negative, and the computer 46 selects the inverting input to amplifier 68 and the laser frequency is driven to a frequency less than $f_1$.

It should be noted that the frequency of the shifted laser 32 will be frequency dithering as the frequency of the reference laser 12 is dithering. Depending on the type of gas cell and the strength of the absorption transition that the tunable laser is locked to, the amount of dithering in the optical frequency may be several kilohertz to a few gigahertz. This may be significant compared to the amount of doppler shift or to the optical bandwidth of the laser system receiver. In the system shown in FIG. 1, the dither frequency $f_4$ which is in the audio range of 10 hertz to 10 kilohertz, may be notched out with a notch filter placed between the r.f. low pass filter 60 and the input to the laser 32 in order to prevent frequency dithering on the frequency shifted laser 32.

Figure 2:
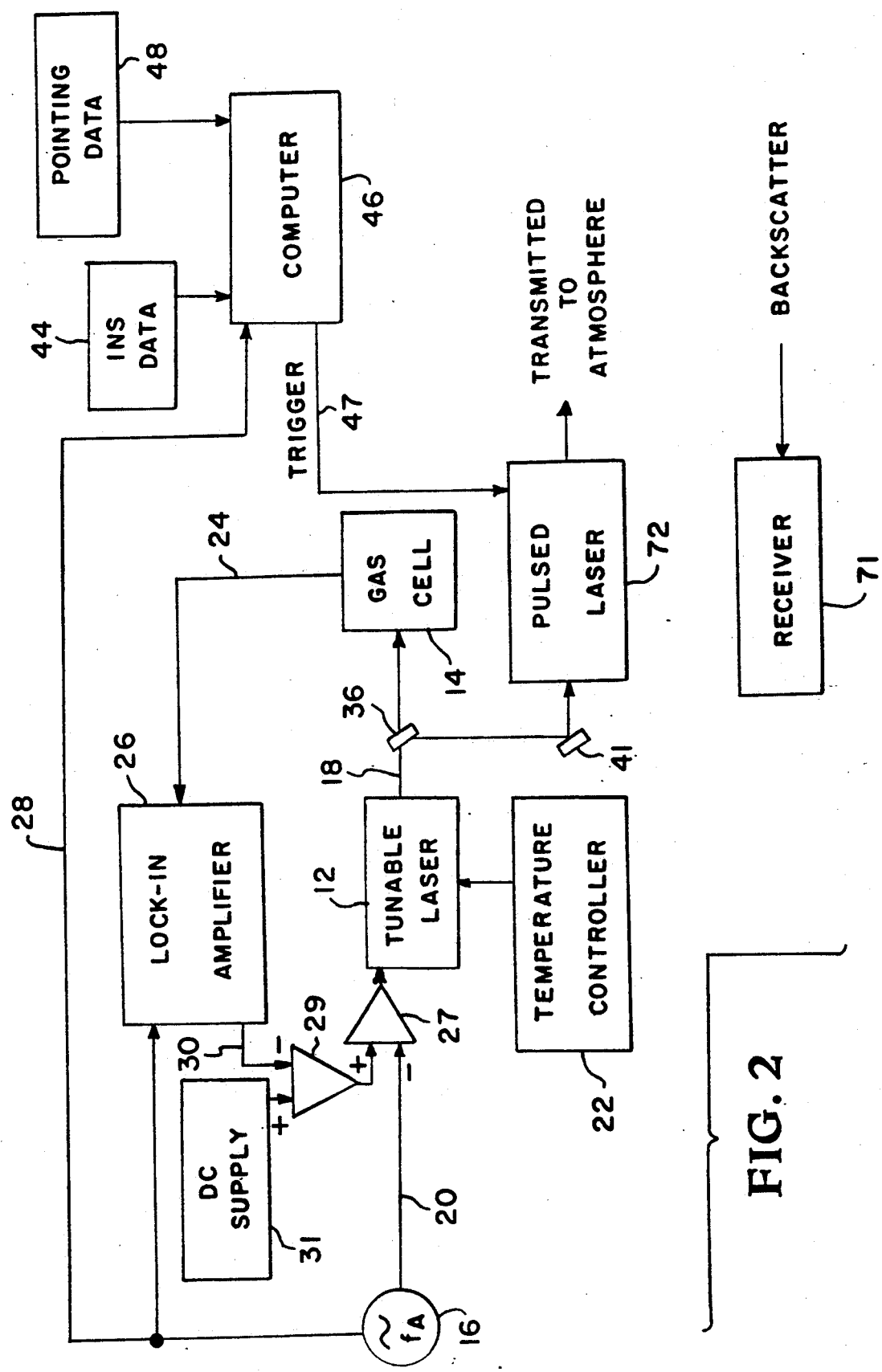
FIG. 2 is a block diagram of a second embodiment of the invention wherein a pulsed laser transmitter system includes a reference laser which is frequency dithered with sufficient magnitude so as to encompass the largest expected, calculated doppler shifts.
Figure 3:
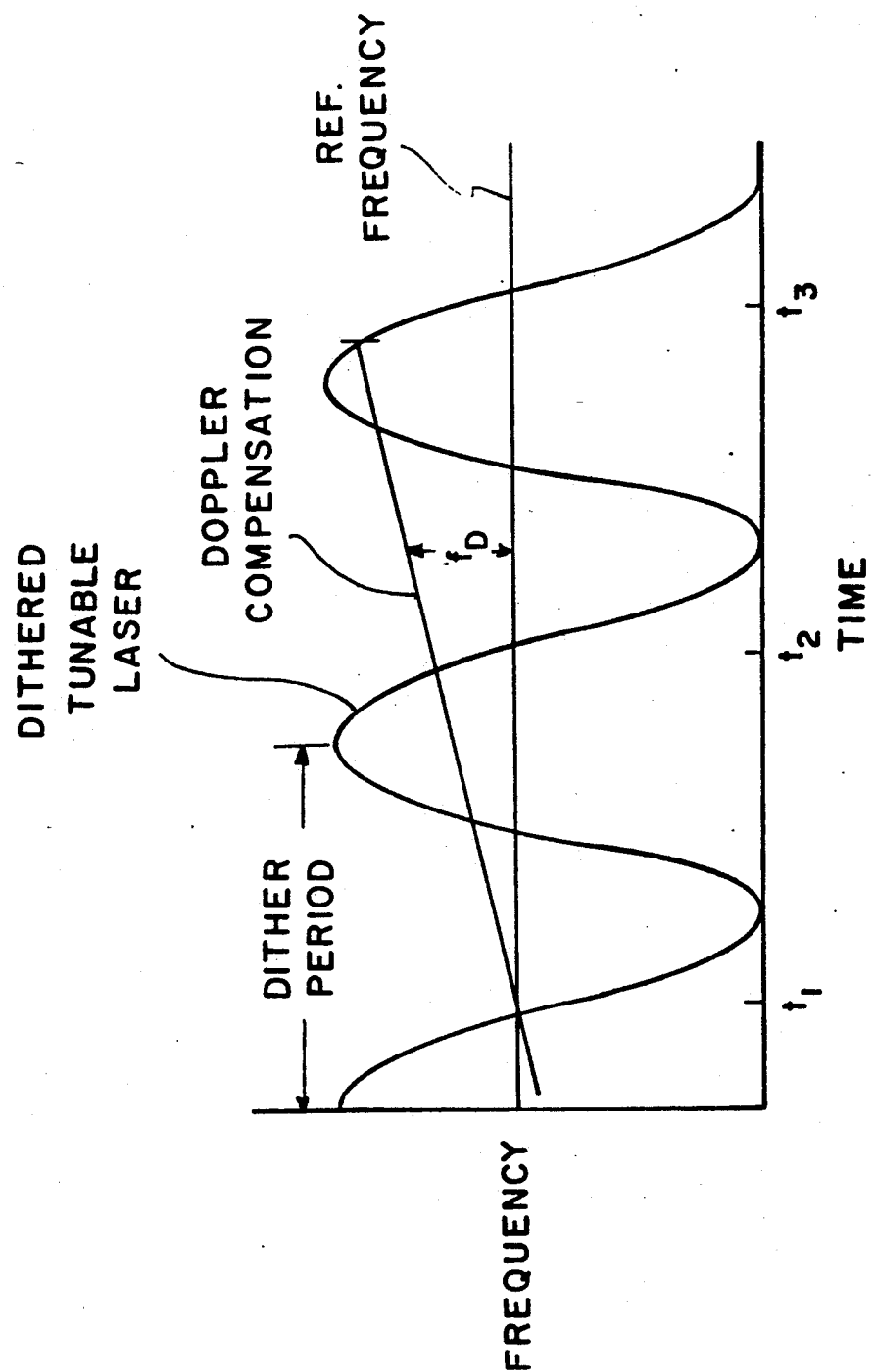
FIG. 3 illustrates the timing relationships between the dithered laser frequency, the doppler shift, and triggering of the pulsed laser in FIG. 2.

An atmospheric remote sensing lidar transceiver system is depicted in FIG. 2, which system uses a receiver 71, in the form of an optical telescope, and a pulsed laser transmitter 72. The output of the reference laser 12 is used to injection seed the pulsed laser. This system is the same as the system of FIG. 1 except the second laser, 32, and the r.f. instrumentation, are not used to generate the shifted laser frequency. Rather, the frequency dither applied to the reference laser is increased to a magnitude sufficient to cover the entire range of doppler shifts to be encountered. As the lidar transceiver is conically scanned with a 10 second rotation period, the doppler shifts will be positive (blue shifted) when the lidar is pointed in the direction of spacecraft motion, and will encounter negative, or red shifts, when pointing opposite the direction of travel. Referring to FIG. 3, the dither frequency is many times greater than the mirror scanning frequency, and the pulse laser transmitter 72 is triggered to emit a pulse when the injection laser 12 reaches the proper, doppler compensated frequency in its dither cycle. For example, using a dither frequency of 10 Hz and a pulsed laser repetition rate of approximately 10 Hz, the laser transmitter 72 will be triggered 3.6 degrees, advanced or retarded, in the dither cycle from the previous trigger, as indicated by $t_1$, $t_2$, etc., on the time axis in FIG. 3. In addition to the inputs to computer 46, as described in FIG. 1, information as to the phase of the dither cycle is provided to the computer 46 by a timing pulse, square wave, or sine wave reference output signal 28 from the current oscillator 16 as shown in FIG. 2. The computer has an analog to digital converter to continuously compute the frequency location of the oscillating reference laser and compares this with a digital representation of the expected doppler shift, as calculated from the inertial navigation system data 44 and pointing data 48, for the purpose of providing a trigger logic signal 47 to the pulsed laser 72.

Figure 4:
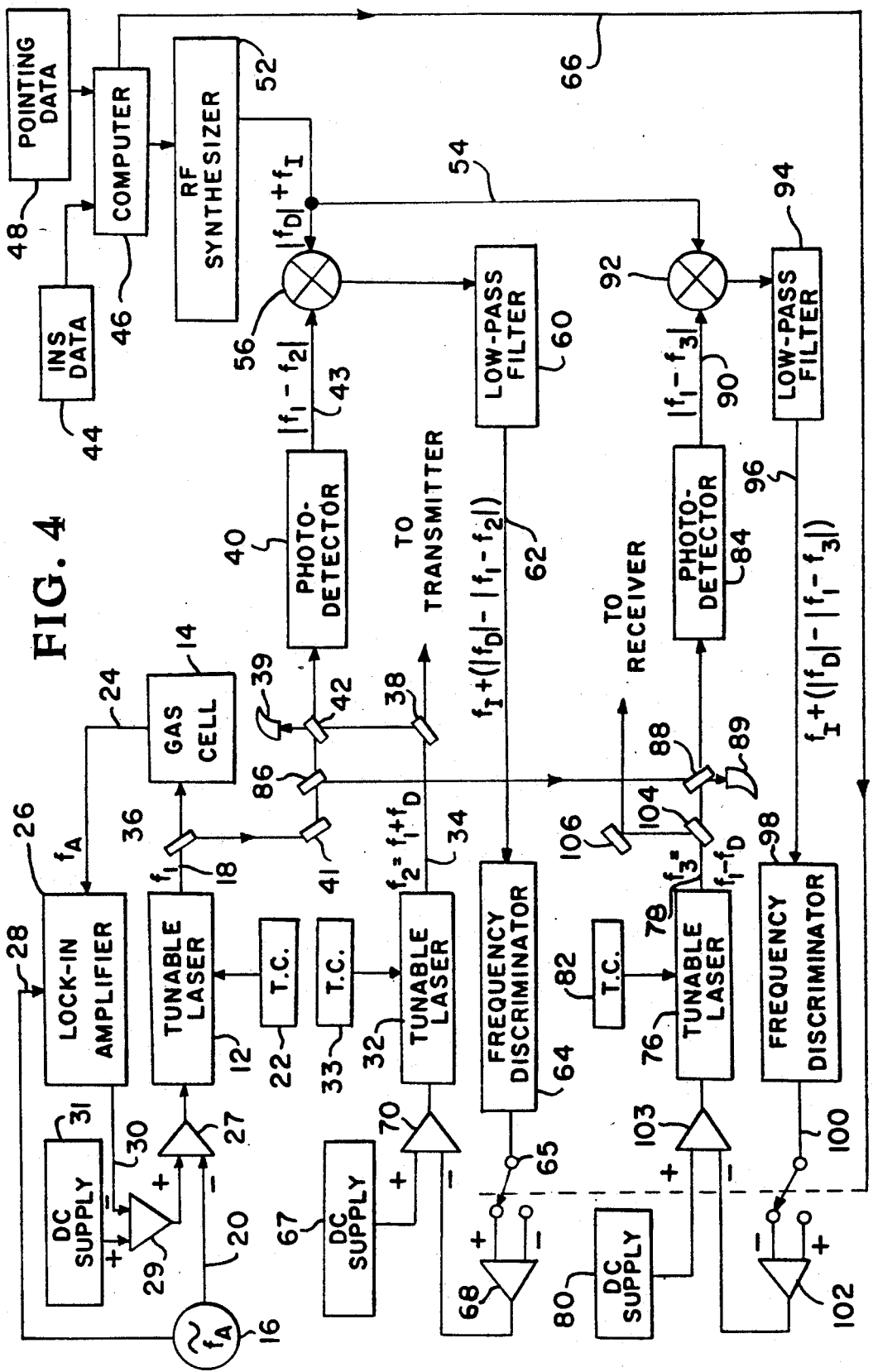
FIG. 4 is a block diagram of a third embodiment of the invention, including a second shifted laser source for actively tuning collocated optical receivers.

The problem of doppler shifts is compounded in remote sensing systems with collocated transmitters and receivers, due to the fact that the transmitter and receiver are both moving relative to the atmosphere being probed. To probe for atmospheric temperature, pressure, and humidity, the laser must be tuned to specific absorption frequencies of oxygen and water vapor. The transmitted laser frequency is doppler shifted due to the relative motion of the transmitter and the atmosphere. The laser must be tuned off of the absorption frequency by an amount equal and opposite to the doppler shift so that it will be doppler shifted back onto the atmospheric absorption frequency. Laser light scattered back to the receiver is doppler shifted again when detected because of the relative motion between the atmosphere and the receiver. Therefore, the receiver filter must be constantly tuned in the direction of the doppler shift to pass the backscattered light, while the transmitter is tuned the same amount in the opposite direction. This problem is solved by means of the system, shown in FIG. 4, which shows a doppler compensation system with two compensated laser frequencies generated by two tunable laser diodes, 32 and 76. This system is the same as that of FIG. 1 except we have added an additional laser 76 accompanied by a photo-detector 84, r.f. mixer 92, and circuitry to generate feedback for the laser 76. The additional laser output 78 has a frequency $f_3$ shifted by an equal but opposite amount as $f_2$ is from $f_1$. Laser 76 is nominally tuned to the reference standard frequency $f_1$ using the bias supply 80 and temperature controller 82. A portion of the laser output 78 is directed to a photo-detector 84, where it is mixed with a portion of the output 18 of the reference laser 12, which output 18 is directed with the use of additional beamsplitters 86 and 88. The unused portion of output 18, from beamsplitter 86, is directed to beam dump 89. As in the single channel system of FIG. 1, the photo-detector output 90 is mixed with the output 54 of r.f. synthesizer 52 in an additional r.f. mixer 92. An additional low pass filter 94 will pass the frequency difference signal 96 consisting of $f_1 + (|f_D| - |f_1 - f_3|)$. The filter output 96 is fed to a frequency discriminator 98 identical to discriminator 64. However, the discriminator output 100 is fed to the opposite input to differential amplifier 102 as the output of discriminator 64 was applied to amplifier 68. The output of differential amplifier 102 is then summed with bias supply 80 by differential amplifier 103. Therefore, the direction of frequency shift of laser 76 will be applied in the opposite direction of the shift applied to laser 12. The remainder of the laser output 78 is available to use as an optical reference frequency for the lidar receiver filter by means of a beamsplitter 104 and a mirror 106. Once locked to this reference, the lidar receiver filter will be tuned to the double doppler shifted laser light backscattered by the atmosphere.

Figure 5:
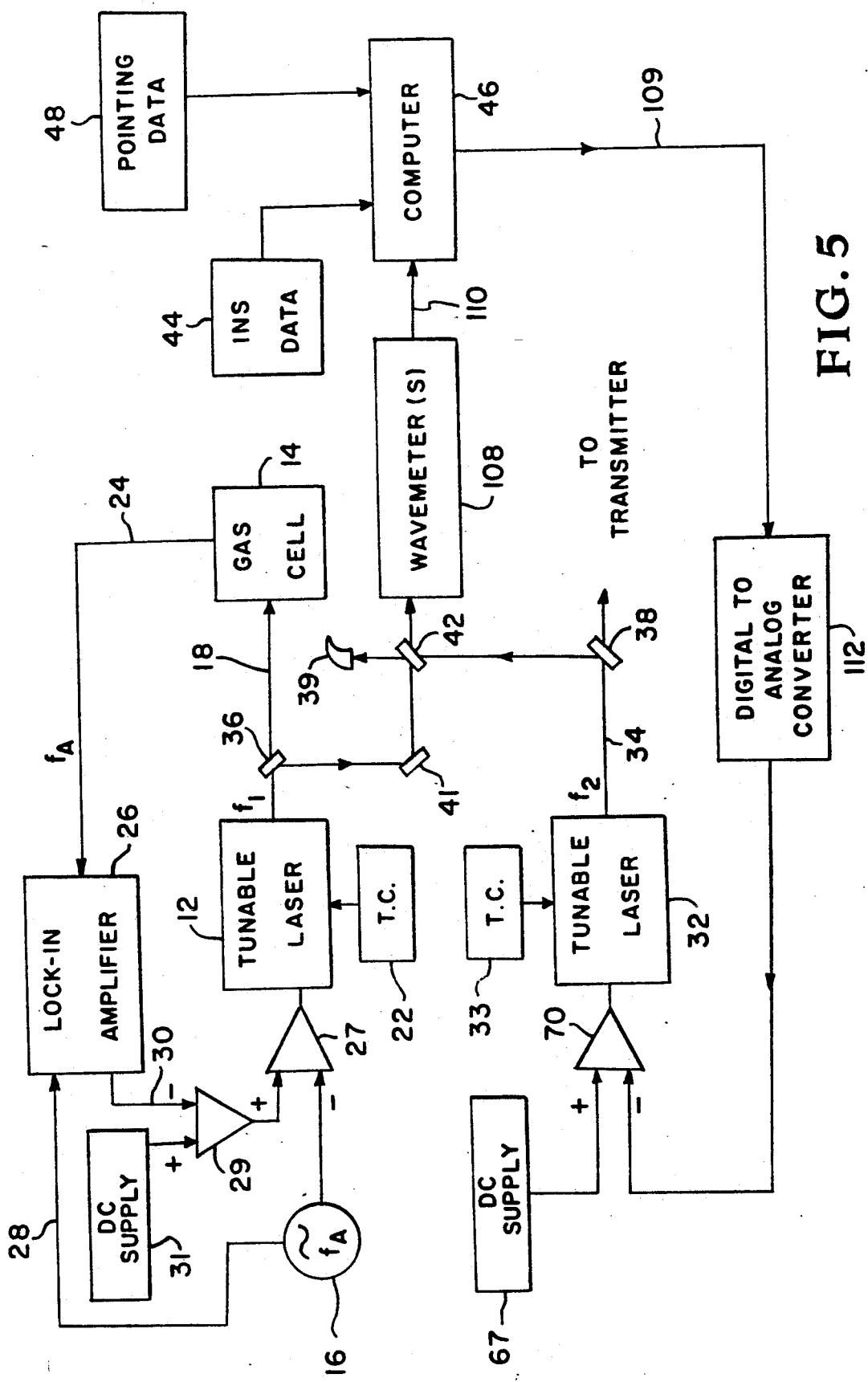
FIG. 5 is a block diagram of a fourth embodiment of the invention using an optical wavemeter or wavemeters to measure the tunable laser frequencies and a computer to calculate their frequency differences and generate the feedback signal.

As previously mentioned, an optical wavemeter (or wavemeters) 108 may be used to measure the frequencies of the various lasers in place of using photo-detectors, as shown in the system of FIG. 5. This system is the same as that of FIG. 1 except the optical frequency mixing to measure laser frequency differences and r.f. heterodyning to develope a feedback signal via elements 40, 52, 56, 60, 64 and 68, are replaced by the wavemeter and a digitally computed feedback signal 109. Most commercial optical wavemeters utilize optical interferometers to generate fringe patterns from which optical wavelengths and frequencies are calculated and relayed to the computer 46 by means of a standard serial or parallel computer interface 110. The wavemeter provides an absolute measure of frequency or relative frequency and the direction of frequency shift of one laser output with respect to another is determined by the sign of the frequency difference calculated by the computer 46. This negates the need to use any r.f. synthesizers, mixers, low pass filters, and frequency discriminators. Instead, computer 46 calculates the desired feedbaok current 114 based on the numerical output of the wavemeter(s) 108, the inertial navigation system data 44, and pointing data 48, and applies this current to the frequency shifted laser(s) 32 by means of an analog to digital converter 112. As with FIG. 1, this system may be employed with either single or double ended configurations.

Obviously, numerous modifications and variations of the present invention are possible in light of this disclosure. It is, therefore, to be understood that within the scope of the appended claims the invention may be practiced other than as specifically described herein.

I claim:

1. Apparatus for compensating for doppler shifts in optical transmission and receiving systems, including:
   means for providing optical signal transmission and receiving;
   means for providing a stable frequency standard;
   means for computing anticipated doppler shifts between the transmission and receipt of said optical signal; and
   means responsive to said frequency standard and said doppler shift computing means to provide for system doppler compensation in the form of a frequency change to either or both of said optical signal transmission and receiving means.

2. The apparatus of claim 1 wherein said stable frequency standard has a dithered output in the optical spectrum.

3. The apparatus of claim 1 wherein said doppler shift computing means is a computer which is inputted with platform navigational and attitude control data as well as pointing data relating to the controlled direction of said optical signal transmission.

4. The apparatus of claim 1 wherein said means for providing for system doppler compensation includes a radio frequency feedback loop.

5. The apparatus of claim 1 wherein said means for providing for system doppler compensation includes a timed trigger pulse from said doppler shift computing means.

6. The apparatus of claim 1 wherein said means for providing for system doppler compensation includes two radio frequency feedback loops.

7. The apparatus of claim 1 wherein said means for providing for system doppler compensation includes a wavemeter.

8. The apparatus of claim 1 wherein said means for providing for system doppler compensation controls the frequency of signal transmission.

9. The apparatus of claim 1 wherein said means for providing for system doppler compensation controls the bandpass of said receiving means.

10. The apparatus of claim 1 wherein said optical signal transmission and receiving means includes a tunable laser.

11. The apparatus of claim 1 wherein said optical signal transmission and receiving means includes a tunable filter.

12. The apparatus of claim 1 wherein said optical signal transmission and receiving means includes a tunable laser and a tunable filter.

* * * * *